Figure 1:
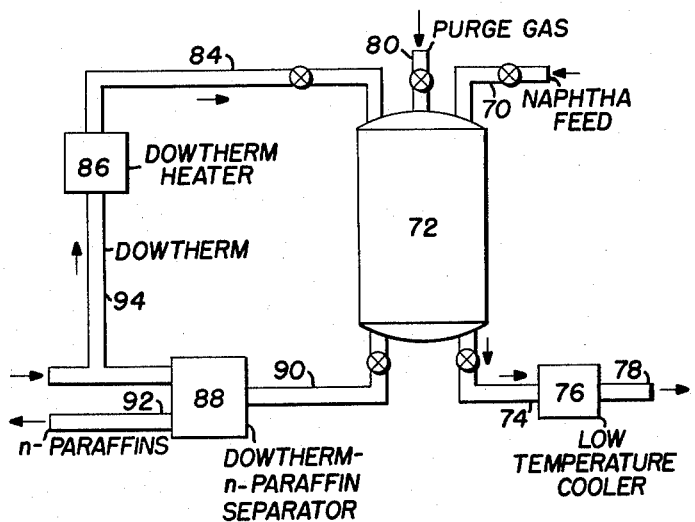

Nov. 1, 1960 K. K. KEARBY 2,958,714
ADSORPTION PROCESS

Filed Aug. 31, 1956 2 Sheets-Sheet 1

Kenneth K. Kearby Inventor

By Richard H. Nagel Attorney

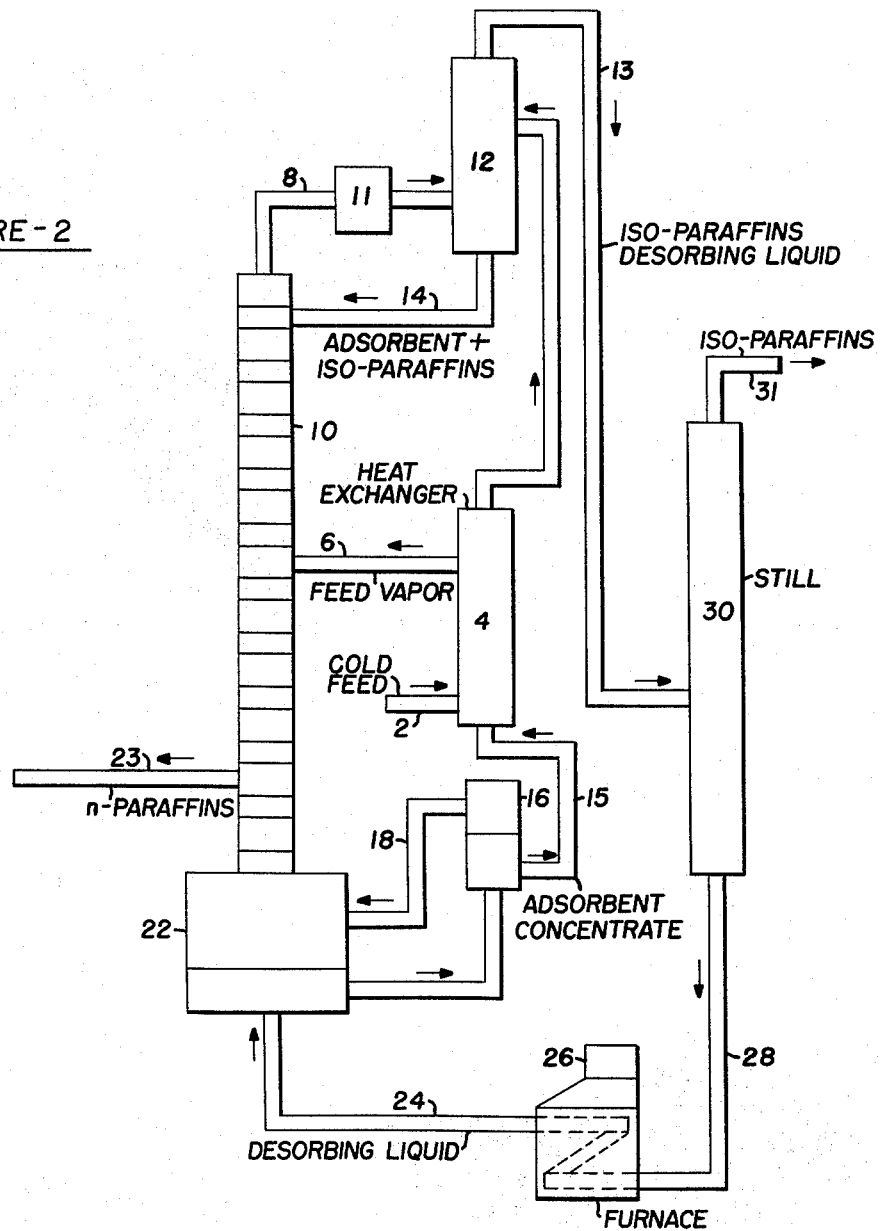

United States Patent Office 2,958,714
Patented Nov. 1, 1960

2,958,714

ADSORPTION PROCESS

Kenneth K. Kearby, Watchung, N.J., assignor to Esso Research and Engineering Company, a corporation of Delaware Filed Aug. 31, 1956, Ser. No. 607,392

4 Claims. (Cl. 260—676)

The present invention relates to a process for separating and segregating straight chain hydrocarbons from mixtures thereof with branched chain or cyclic hydrocarbons. More particularly, the present invention relates to the separation of relatively straight chain hydrocarbons from branched chain isomers employing a class of natural or synthetic adsorbents termed, because of their crystalline patterns, molecular sieves. Still more particularly, the present invention relates to an improved desorption process whereby the hydrocarbon adsorbed on the sieve is recovered in a manner resulting in higher recovery and adsorbent efficiency than hitherto found possible.

It has been known for sometime that certain zeolites, both naturally occurring and synthetic, have the property of separating straight chain from branched chain hydrocarbon isomers, as well as from cyclic and aromatic compounds. These zeolites have innumerable pores of uniform size, and only molecules small enough to enter the pores can be adsorbed. The pores may vary in diameter from 3 or 4 Angstroms to 15 or more, but it is a property of these zeolites that any particular sieve has pores of a substantially uniform size.

The scientific and patent literature contains numerous references to the sorbing action of natural and synthetic zeolites. Among the natural zeolites having this sieve property may be mentioned chabasites. A synthetic zeolite with molecular sieve properties is described in U.S. 2,442,191. Zeolites vary somewhat in composition, but generally contain the elements of silicon, aluminum and oxygen as well as an alkali and/or an alkaline earth element; e.g., sodium and/or calcium. The naturally occurring zeolite analcite, for instance, has the empirical formula $NaAlSi_2O_6 \cdot H_2O$. Barrer (U.S. 2,306,610) taught that all or part of the sodium is replaceable by calcium to yield, on dehydration, a molecular sieve having the formula $(Ca, Na_2) Al_2Si_4O_{12} \cdot 2H_2O$. Black (U.S. 2,522,426) describes a syntheic molecular sieve zeolite having the formula $4CaO \cdot Al_2O_3 \cdot 4SiO_2$. A large number of other naturally occurring zeolites having molecular sieve activity; i.e., the ability to adsorb a straight chain hydrocarbon and exclude the branch chain isomers due to differences in molecular size, are described in an article "Molecular Sieve Action of Solids" appearing in Quarterly Reviews, vol. III, pages 293–320 (1949) published by the Chemical Society (London).

The segregation or removal of branched chain or straight chain isomers from hydrocarbon mixtures, either for the purpose of enriching the mixture in branched chain components or for isolating and recovering straight chain isomers, has become increasingly important in industry with the growing realization that the activity, potency and desired physical property of a product may depend upon the specific structure of the various possible hydrocarbons utilizable as reactants in the preparation or manufacture of the final product. Thus, in the preparation of high octane fuels, the presence of paraffinic straight chain hydrocarbons makes for a lower octane fuel. On the other hand, in the manufacture of synthetic detergents such as the alkyl aryl sulfonates, a straight chain nuclear alkyl substituent confers better detergency characteristics than a branched chain isomer. Numerous other examples might be cited.

Though it has in the past been proposed to make these separations; i.e., of straight chain hydrocarbons from branched chain hydrocarbons and from aromatics, by molecular sieves, and though excellent and selective separations have been realized, a serious problem has arisen when it has been attempted to recover the adsorbed material and to regenerate the molecular sieve or zeolite. The conventional means described in the art are steaming, purging with nitrogen or methane or the like. In commercial installations it is necessary to employ a cyclic operation; i.e., an adsorption step followed by desorption and regeneration of the sieve, and thereafter another adsorption step. It has been found that regeneration or reactivation by the conventional methods of heating, evacuation, steaming and the like results in a marked decline in the adsorptive capacity of the sieves. For instance, in a process wherein a virgin naphtha fraction was treated with a synthetic molecular sieve having a pore diameter of 5 Angstroms to separate straight from branched chain constituents, and the sieve desorbed and regenerated between cycles by steam stripping followed by nitrogen flushing, the sieves decreased in capacity to 59% of fresh capacity after only three cycles. Similarly, continued treatment of the sieves with steam at high stripping temperature causes them to deteriorate further.

It is therefore the principal purpose of the present invention to set forth an improved method of desorbing and stripping hydrocarbons adsorbed in the uniform pores and cavities of certain natural and synthetic zeolites, commonly called molecular sieves.

It is also a purpose of the present invention to provide desorption means which prolong substantially the life of the molecular sieve adsorbent.

It is a still further purpose of the present invention to provide a desorption means which minimizes degradation of the adsorbent.

Other and further purposes of the present invention will appear in the following more detailed description and claims hereinafter.

One of the serious problems encountered in using this adsorption tool is the extremely fine state of subdivision of the crystals. They are readily synthesized by controlled interaction of aqueous solutions of sodium aluminate and sodium metasilicate at elevated temperatures, filtering, drying the sodium aluminum silicate, and base exchanging, if desired. Base exchanging the sodium form with calcium increases the pore opening of the one type of sieve from 4 to 5 Angstrom units. The base exchanged product is washed, dried and activated by calcination. The final product is extremely finely divided, having a particle size of the order of 5–10 microns or even less. This limits severely the means by which the adsorbent may be regenerated. Blowing with steam or purge gas is difficult because of entrainment of the finely divided powder. Similarly, desorption means whereby the adsorbent alternately passes from a wet to a dry state each cycle tends to increase the tendency of the adsorbent to disintegrate, when it is employed, for instance, as an extruded pellet.

In accordance with the present invention, straight chain hydrocarbons and olefins or other adsorbed materials are desorbed from molecular sieve adsorbents by supplying to the adsorption bed heat provided by high boiling liquids which themselves are not adsorbed in the pores of the sieves. Such liquids are, for instance, branched or cyclic hydrocarbons, for example diphenyl or the well known mixture of diphenyl and diphenylene oxide called "Dowtherm." Other high boiling liquids that may be used are alkyl or aryl aromatics, tetralin, decalin, and compounds containing five instead of six carbon atoms in the rings or in which one or more carbons have been substituted by nitrogen, oxygen or sulfur. Branched chain paraffins and olefins boiling above the adsorbate may also be used. Such a system has marked advantages, not only over purging with hot inert gas, which would require a difficult separation between the adsorbate and the purge gas if a light hydrocarbon such as ethylene were being desorbed, but also over other means of supplying heat, as by steam coils.

The adsorbed material can normally be distilled off without vaporizing the desorbing agent and thus without requiring additional heat for its vaporization. Also, expensive fractionation equipment and costly reflux heat are unnecessary. For example, normal pentane, hexane and heptane which have been adsorbed from a naphtha can be desorbed with diphenyl and then merely be flash-distilled from the diphenyl when it is reheated in a fired coil for return to the desorbing zone. In general the use of a stripping agent which boils higher than the adsorbed material is preferable to one boiling lower. In the latter case one must evaporate and recondense the large amount of desorbing agent and it is usually also necessary to fractionally distill the desorbed products.

For example, if a $C_5$ to $C_7$ normal paraffin fraction is desorbed with an equal volume of propylene, some fractional distillation is required to separate the propylene from the normal pentane and the entire $C_5$ to $C_7$ stream will normally be redistilled to remove any polymer formed. When the same $C_5$ to $C_7$ normal paraffins are desorbed with an equal volume of diphenyl they can be flash distilled without reflux from the diphenyl and no evaporation of the diphenyl is required. Also, the aromatic desorbing agent has a solvent action which prevents traces of higher boiling gums or resins from depositing on the sieve, whereas olefin streams tend to deposit such materials and cause a loss of capacity of the sieve. This is of special value when normal olefins are being separated from branched olefins. In such cases it is also important to use a sieve which is devoid of polymerization activity. Such a sieve may be obtained from a regular calcium-chloride-exchanged sieve by washing it with lime water.

Furthermore, in accordance with the present invention, the powder can at all times be wet with either feed or desorbent liquid, and hence, degradation and dusting are minimized.

The invention may best be understood when read together with the drawing, showing diagrammatic representations of preferred embodiments of the present invention.

Figure 1 describes an embodiment employing a fixed bed of adsorbent; and

Figure 2 sets forth an embodiment employing the adsorbent in a moving bed.

Turning now to Figure 1, a light virgin naphtha is employed as a feed to the process. A typical virgin naphtha feed boiling below 200° F. may contain 20 to 30% of normal hexane and heptane, the remaining material being mostly $C_6$ and $C_7$ branched and cyclic hydrocarbons. On a molecular sieve of 5 Angstrom pore diameter, only the normal paraffins will be adsorbed.

Feed is admitted through line 70 to fixed bed adsorption tower 72. The naphtha may be preheated by passage through a heat exchanger (not shown) and is at a temperature of about 100° to 300° F. The normal paraffins contained in the feed will be adsorbed by the sieve, which is preferably the calcium-sodium-aluminum silicate zeolite prepared in a manner hitherto outlined. The non-adsorbed material, or raffinate, consists essentially of non-normal hydrocarbons, paraffins, olefins, aromatics or alicyclics, and is continuously withdrawn until saturation is complete and normal paraffins appear in the effluent. The amount of n-paraffins adsorbed is generally about 8 to 10 pounds per 100 pounds of adsorbent.

The non-normal hydrocarbon stream, having a substantially higher octane number than the feed, is withdrawn continuously through line 74, cooled in 76, and passed via line 78 to the refinery high octane gasoline pool or to other processing equipment.

When the adsorbent becomes saturated and normal hydrocarbons appear in the effluent, a high boiling liquid, such as diphenyl or "Dowtherm" or other composition is passed through line 84 into adsorber 72. Desorption temperatures are in the range of 200° to 600° F. Pressures within 72 during the desorption cycle may vary from about 1 to 100 p.s.i., depending on the particular desorbing agent used. In this manner, the bed may be very quickly heated up and desorption can take place by virtue of the higher temperatures and the purging action of the desorbing material.

Desorbed normal paraffins and olefins, as well as high boiling desorbent, are withdrawn from vessel 72 through line 90 and passed to separator 88 where the n-paraffins are readily flashed from the high boiling liquid desorbent. The latter is passed via line 94 to heater 86 and is heated up to about 200° to 600° F. for recycle to the vessel 72 in the desorption cycle. The normal paraffins may then be passed to other refinery operations such as hydroforming, aromatization, isomerization, or dehydrogenation to valuable straight chain olefins, or they may be used as solvents, jet fuels, etc.

Alternatively the adsorption may be made with vaporized liquid naphtha feed, and a vaporized desorbing agent. The latter can be removed by a partial condenser. It is also possible to let the desorbing agent condense in the adsorbing vessel 72 and supply its latent heat, although this will increase disintegration unless very strong adsorbents are used.

If desired, the desorption cycle may include, toward its end, a reduction of pressure within vessel 72 to aid in removing the last traces of adsorbed normal paraffins. Alternately or concomitantly, a small amount of refinery purge gas heated to 200° to 600° F. may be used for this purpose.

The adsorbent bed containing hot desorbent may be partially cooled with a stream of cold desorbent before it is used for the next separation cycle. The cold desorbent is thus partially heated before going to a heater for further heating.

In carrying out the next cycle, naphtha feed at a relatively low temperature of 60° to 100° F. may be introduced through line 70 into adsorber 72. The unadsorbed fraction; i.e., the non-normal paraffins and cyclics, serve to cool down the adsorbent bed and increase its adsorptive capacity for the normal paraffin constituents of the feed. The naphtha feed temperature is usually chosen to provide a final bed temperature of 100° to 300° F. The higher temperatures improve adsorption-desorption rates but give some reduction in capacity per cycle.

An embodiment of the present invention employing the sieves in a moving bed is shown in Figure 2. The use of the high boiling liquid enables operation without the adsorbent passing from a wet to a dry state, particularly when liquid downflow is employed in the adsorber. This enables use of extremely fine adsorbent, and reduces disintegration of larger size particles.

Turning now to Figure 2, the feed naphtha to be separated, such as virgin naphtha or hydroformate prepared by hydroforming virgin naphtha in the presence of a platinum or molybdenum oxide-alumina catalyst, may be passed via line 2 into heat exchanger 4 where it can be heated to about 250° F. and be passed through line 6 into adsorption column 10. The latter may be in the form of a distillation column, having plates or baffles or may be packed with large spheres or rings, etc.

The adsorbent is passed via line 14 into column 10 and flows downwardly. With narrow boiling feeds, the normal paraffins are lowered in vapor pressure by the presence of the sieve adsorbent, and the volatility of the isoparaffins is relatively higher. Thus, the latter unadsorbed stream passes overhead through line 8 and may be recycled in part through line 14 to provide reflux at the top of the column. The process thus resembles an extractive distillation operation.

The downflowing stream of sieves and adsorbed n-paraffins passes to a boiler 22 at the bottom of column 10, which contains a high boiling liquid, such as "Dowtherm" heated to about 200° to 600° F. The sieves are desorbed at this high temperature and the desorbate, consisting essentially of normal paraffins, is withdrawn from the column through line 23 for further processing.

The desorbed sieves and "Dowtherm" are then passed to separator 16. The adsorbent settles in the bottom and an adsorbent-free stream may be withdrawn through line 18 and returned to boiler 22. The concentrated slurry of adsorbent in the desorbing medium is then passed by line 15 through heat exchanger 4 which preheats the feed. The cooled stream of adsorbent and desorbing medium is then passed by line 17 to vessel 12. In vessel 12 the adsorbent settles through an upflowing stream of condensed unadsorbed isoparaffins from condenser 11. This stream displaces the desorbing medium upward and replaces it as a carrying agent for the adsorbent. The adsorbent-isoparaffin mixture is returned to the column through line 14.

The desorbing liquid (Dowtherm) and isoparaffin product are withdrawn from vessel 12 via line 13 and passed to still 30 where the isoparaffins are readily flashed off and withdrawn through line 31. The high boiling desorbent is taken as bottoms product, passed via line 28 through furnace 26 and recycled at 600° F. via line 24 to boiler 22. It is possible, of course, to eliminate settler 16 and pass all of the desorbing liquid through vessels 4 and 12.

The process of the present invention may be subject to many variations without departure from its spirit. Thus, wide boiling feed stocks may be employed and the bed may be moved downwardly countercurrent to the upflowing vapors at a temperature some 25° to 50° F. above the boiling point of the highest boiling fraction in the feed. This makes the separation relatively independent of boiling range, and it is thus possible to concentrate the n-paraffins from a mixture of branched paraffins, naphthenes and aromatics in as broad a range as $C_5$ to $C_9$ hydrocarbons. Also, the process may be used for any separation of components in which one material is selectively adsorbed. For example, ethylene may be adsorbed from ethane, CO from $H_2$, $CH_4$ from $H_2$, and polar from less polar or non-polar molecules. The process as described above used a vapor phase feed and a high boiling liquid desorbing medium. It is also possible to operate with the naphtha as a liquid phase in column 10.

The use of the high boiling liquid (Dowtherm) is advantageous but it is not absolutely necessary. The process can operate as an extractive distillation or liquid extraction type process in which the solid adsorbent replaces the conventional liquid extractant. In this case the sieve may be desorbed by other heating methods and some of the normal paraffins returned to the bottom of the column as reflux. The adsorbent may be stripped with a small amount of unadsorbed raffinate before the adsorbent is cooled and returned to the desorber. The mixture of stripped gases is returned to a mid-section of the adsorber having a similar composition.

In addition to the completely vapor and extractive distillation type process, it is possible to operate with a completely liquid process with the solid adsorbents. This is comparable to liquid extraction except that a solid adsorbent is used instead of a liquid extractant. All of these processes may be operated with reflux returned to the column and with multiple stages obtained by conventional methods. Thus, perforated plates, bubble caps, packed columns, etc., may be used. Stirrers may also be used in the columns to keep the solids suspended.

The advantages of this invention are illustrated in the following example.

In a fixed bed process, as illustrated in Figure 1, the feed may consist of a mixture of $C_5$ and $C_6$ hydrocarbons in a light naphtha. Five volumes of a feed containing 19.3% of n-hexane and 2.5% of n-heptane is passed in one hour at 80° F. through one volume of a 5 Angstrom pore size molecular sieve. The effluent obtained contains less than two percent of normal paraffins. Two volumes of diphenyl heated to 500° F. are then passed through the sieve. This is followed by five volumes of naphtha at 80° F. and under sufficient pressure to prevent boiling. The feed naphtha displaces the diphenyl and normal paraffins are adsorbed from it. The total diphenyl product is flash distilled to remove the normal paraffins and is then recycled through a heater to another desorbing vessel. By using a number of vessels the process is continuous. The naphtha with an initial clear research octane number of 71 gives a 75 percent yield of product having an octane number of 84 and a 25 percent yield of almost pure normal paraffins.

Summarizing, therefore, thermal desorption has the advantage of high sieve capacity for a reasonable increase in temperature. Indirect heating, however, on a commercial scale is impractical because of the huge heating surface required and also because of the high heating and cooling load requirements. The use of a heated inert gas for this purpose leads to high cost for recycle compression and component separation. Similarly, vacuum desorption is extremely expensive at the very low pressures necessary to maintain a large sieve capacity.

The advantages of thermal desorption and partial pressure reduction are met, in accordance with this invention, by direct contact of the sieve with the high boiling nonadsorbable material such as Dowtherm. The use of the high boiling material allows the separation of the absorbed component from the desorption stream by simple fractionation. The desorbent may be superheated to minimize the recycle rate and its heat of condensation may or may not be utilized for heating the sieve bed. It is separated from the bottom of the fractionator as a liquid and consequently may be recycled by the use of a pump. This saves considerable horsepower over the recycle of a heat-carrying inert gas which must be done by a compressor.

What is claimed is:

1. An improved moving bed process for separating straight chain hydrocarbons from their mixtures with non-straight chain hydrocarbons which comprises passing a mixture comprising normal paraffins to an elongated adsorption zone, passing a vertically moving bed of zeolitic molecular sieves to an upper portion of said zone, withdrawing from the top of said zone unadsorbed non-straight-chain components of said mixture, passing downwardly through said zone a stream of said sieves containing adsorbed n-paraffins, passing said stream of sieves into a desorption zone containing a high boiling aromatics-comprising liquid heated to a temperature of from about 200° to 600° F., said aromatics-comprising liquid being characterized by not being adsorbed by said sieves, withdrawing desorbed n-paraffins from a lower portion of said first named adsorption zone, withdrawing from said desorption zone a mixture of desorbed sieves and desorbent, passing, in a third zone, a mixture of desorbed sieves and desorbents through an upflowing stream of condensed non-straight-chain hydrocarbons withdrawn from said adsorption zone, removing from said third zone a first stream comprising said desorbed sieves and non-straight-chain hydrocarbons and passing said first stream to an upper portion of said adsorption zone, removing from said third zone a second stream compris- ing non-straight chain hydrocarbons and displaced desorbent and passing said second steam to a distillation zone, separating said non-straight chain hydrocarbons from said desorbent, and passing said desorbent to said desorption zone.

2. The process of claim 1 wherein said mixture of desorbed sieves and desorbent is passed to a settling zone, the upper layer recycled to said desorption zone, and a concentrated slurry passed through said stream of condensed non-straight chain hydrocarbons.

3. The process of claim 1 wherein said desorbent is a mixture of diphenyl and diphenylene oxide.

4. The process of claim 1 wherein said mixture is a naphtha boiling in the range of $C_6$–200° F.

References Cited in the file of this patent

UNITED STATES PATENTS

| | | |
|---|---|---|
| 2,306,610 | Barrer | Dec. 29, 1942 |
| 2,384,311 | Kearby | Sept. 4, 1945 |
| 2,554,908 | Hirschler | May 29, 1951 |
| 2,585,492 | Olsen | Feb. 12, 1952 |
| 2,698,870 | Bloch et al. | Jan. 4, 1955 |
| 2,768,221 | Findlay | Oct. 23, 1956 |
| 2,818,455 | Ballard et al. | Dec. 31, 1957 |
| 2,858,901 | Fort | Nov. 4, 1958 |
| 2,859,256 | Hess et al. | Nov. 4, 1958 |